(12) United States Patent
Angelucci et al.

(10) Patent No.: US 6,185,573 B1
(45) Date of Patent: Feb. 6, 2001

(54) METHOD AND SYSTEM FOR THE INTEGRATED STORAGE AND DYNAMIC SELECTIVE RETRIEVAL OF TEXT, AUDIO AND VIDEO DATA

(75) Inventors: Vincent Angelucci, Broomall, PA (US); Stephen Madaras, Germantown, MD (US)

(73) Assignee: Millenium Integrated Systems, Inc., Broomall, PA (US)

( * ) Notice: Under 35 U.S.C. 154(b), the term of this patent shall be extended for 0 days.

(21) Appl. No.: 09/063,899

(22) Filed: Apr. 22, 1998

(51) Int. Cl.$^7$ ................................................. G06F 17/30
(52) U.S. Cl. ........................ 707/104; 707/103; 705/1; 705/7; 705/11
(58) Field of Search ........................ 707/103, 104, 707/512; 345/302; 375/240; 705/1, 7, 11; 395/615; 364/401

(56) References Cited

U.S. PATENT DOCUMENTS

| | | | |
|---|---|---|---|
| 4,208,109 | 6/1980 | Hinote | 353/15 |
| 4,821,469 | 4/1989 | Bayless | 52/33 |
| 4,870,576 | 9/1989 | Tornetta | 705/1 |
| 5,032,989 | 7/1991 | Tornetta | 705/1 |
| 5,117,353 * | 5/1992 | Stipanovich et al. | 705/11 |
| 5,283,731 * | 2/1994 | Lalonde et al. | 364/401 |
| 5,481,542 | 1/1996 | Logston et al. | 348/7 |
| 5,528,282 | 6/1996 | Voeten et al. | 348/7 |
| 5,568,181 | 10/1996 | Greenwood et al. | 348/7 |
| 5,583,561 | 12/1996 | Baker et al. | 348/7 |
| 5,592,375 * | 1/1997 | Salmon et al. | 705/7 |
| 5,594,490 | 1/1997 | Dawson et al. | 348/6 |
| 5,594,491 | 1/1997 | Hodge et al. | 348/7 |
| 5,640,453 | 6/1997 | Schuchman et al. | 380/211 |
| 5,664,046 | 9/1997 | Abecassis | 386/125 |
| 5,664,111 | 9/1997 | Nahan et al. | 705/27 |
| 5,664,115 | 9/1997 | Fraser | 705/37 |
| 5,675,738 | 10/1997 | Suzuki et al. | 709/219 |
| 5,742,816 * | 4/1998 | Barr et al. | 395/615 |
| 5,758,324 * | 5/1998 | Hartman et al. | 705/1 |
| 5,832,497 * | 11/1998 | Taylor | 707/104 |
| 5,884,270 * | 3/1999 | Walker et al. | 705/1 |
| 5,884,272 * | 3/1999 | Walker et al. | 705/1 |
| 5,963,951 * | 10/1999 | Collins | 707/102 |
| 5,978,768 * | 11/1999 | McGovern et al. | 705/1 |
| 6,064,967 * | 5/2000 | Speicher | 705/1 |

OTHER PUBLICATIONS

National Association of Realtors and RealSelect, Inc., Realtor.com, 1995, 1996, 1997, 11 pages.
Virtual Properties, Inc., Virtual–properties.com, 1997, 6 pages.
Online Milwaukee Journal Sentinel, Web acts as home browser, Aug. 10, 1997, 2 pages.

\* cited by examiner

Primary Examiner—Hosain T. Alam
Assistant Examiner—Ella Colbert

(57) ABSTRACT

The present invention is an automated system to input text, audio and video data, to integrate the storage of the data at a central location, to initiate queries of search criteria to the central location from remote locations, and to dynamically transmit text, audio and video data to the remote locations in accordance with the search criteria.

36 Claims, 11 Drawing Sheets

GetaRealJob™ Resume Information Update

| | | |
|---|---|---|
| *First Name: | Roy | 310 |
| Middle Initial: | F | |
| *Last Name: | Batty | |
| | | |
| *Address 1: | 2121 Farmington Ave | 312 |
| Address 2: | Apt 201 | |
| *City: | Boyertown | |
| *State: | Pennsylvania ▼ | |
| *Zip: | 19478 | |
| | | |
| *Contact Phone: | (610)345-6789 | 314 |
| Alternate Phone: | | |
| Fax: | | |
| *Email: | roy@roybatty.com | 316 |
| Personal URL: | http://www.roybatty.com | 318 |

\* = Required Information

Do you wish to keep this data "private": ○ Yes  ● No  [Help]   320

322 [Next Page]   [Clear Entries]

*Fig. 3a*

GetaRealJob™ Resume Information Update

Please Enter Your Education Background Below

Associates Degree Information — 324

- School: [ ]
- Degree: [No Major Selected ▼]
- Year: [ ]
- GPA: [ ]

Bachelor Degree Information — 326

- School: [Penn State]
- Degree: [Peace and Justice ▼]
- Year: [1993]
- GPA: [3.7]

Master Degree Information — 328

- School: [Penn State]
- Degree: [Criminal Justice]
- Year: [1995]
- GPA: [3.8]

Doctorate Degree Information — 330

- School: [ ]
- Degree: [ ]
- Year: [ ]

Fluent Foreign Languages — 332

☐ Chinese  ☑ French  ☑ German  ☑ Italian  ☐ Japanese

☐ Spanish  ☐ Russian  Other Languages: [ ]

Please Enter Your Professional Certifications Below 334

- Certification 1: [CNE]
- Certification 2: [CPA]
- Certification 3: [ ]

[Next Page] 336

*Fig. 3b*

GetaRealJob™ Resume Information Update

Please Enter Your Employment Criteria Below

Commitment Interest ⦿ Full Time ◯ Part Time ◯ Both   338

Field: [ Sales ▼ ]   340
*Years of Experience: [ 13 ]   342
Level: [ Middle Management ▼ ]   344
Salary: [ Open ▼ ]   346

Travel?: ◯None   ◯Up to 25%   ◯25% to 50%   ◯Over 50%   348

Willing to Relocate?: ⦿ Yes   ◯ No   350

Availability: ◯Immediately ◯1 Week ⦿2 Weeks ◯3 Weeks ◯Other   352

Actively Looking?: ⦿ Yes   ◯ Willing to Consider New Opportunity   354

Enter Up To 5 Major Accomplishments (100 characters max. each)   356

An employer will see this information first!

[                                                            ]

[                                                            ]

[                                                            ]

[                                                            ]

[ Update Data ]        [ Clear Entry ]

[ Next Page ]   357

*Fig. 3c*

GetaRealJob™ Search Criteria Form

| Professional Field 502 | State 504 | Willing to Relocate? 506 |
|---|---|---|
| Accounting ▼ | ▼ | ○ Yes  ● No |

| Level 508 | Years of Experience Range | Salary Range 512 |
|---|---|---|
| All ▼ | ☐ to ☐  510 | Open ▼ |

Degree 514

● All Degrees  ○ Associates  ○ Bachelors  ○ Masters  ○ Doctorate

| Associate Degree 516 | Bachelor Degree 518 |
|---|---|
| No Major Selected ▼ | No Major Selected ▼ |

Fluent Foreign Languages 520

☐ Chinese  ☐ French  ☐ German  ☐ Italian  ☐ Japanese

☐ Spanish  ☐ Russian  Other Languages: ☐

Travel 522          Desired Employment 524

● Any  ○ At least 25%          ● Full Time  ○ Part Time/Co-Op
○ At least 50%          ○ Independent Contractor  ○ All

Include Resumes Updated Within the Last: 526          Include Candidates Without Videos? 528

All ▼          ☐ Yes

Keywords (ex. "COBOL, C++, Java" or "COBOL AND C++ OR Java")  530

[                                                                  ]

OR

ENTER a Candidate's User ID: [                          ] 532

[ Search ] 534

*Fig. 5*

REZVU System™ Employer Search Results  600

Your search matched 2 candidates. 2 candidates displayed. (16)  602

John Doe 604    My Town, PA 99999

(click photo for more details)

| Education | Major | Year | School | GPA | |
|---|---|---|---|---|---|
| Associates: | --- | --- | --- | --- | 606 |
| Bachelors: | Accountancy | 1995 | My University | 3.2 | 608 |
| Masters: | MBA | 1998 | My Other University | 3.5 | 610 |
| Doctorate: | --- | --- | --- | --- | 612 |

| | | | |
|---|---|---|---|
| Certifications: | CPA  614 | --- | |
| Desired Salary Range: | 50000 to 60000  616 | Years of Experience: | 3    622 |
| Desired Employment: | Full  618 | Willing to Relocate: | Yes   624 |
| Travel: | Over 50%  620 | | |

Major Career Accomplishments   626

*Fig. 6*

REZVU System™ Candidate Focus 700

John Doe 702
My Street
My Town, PA 99999
Phone: 610-555-1212
Fax: 610-555-1313
Email: me@my_mail.com
Personal URL: http//www.my.com/me/me.htm (click photo to view interview)

REZVU System ID: JXD2720

EDUCATION PROFILE

|  | Degree | College/University | GPA | Year |  |
|---|---|---|---|---|---|
| Associates: | --- | --- | --- | --- | 706 |
| Bachelor: | Accountancy | My University | 3.2 | 1995 | 708 |
| Master: | MBA | My Other University | 3.5 | 1998 | 710 |
| Doctorate: | --- | --- | --- | --- | 712 |

CERTIFICATIONS

| CPA | --- | --- | 714 |
|---|---|---|---|

FLUENT FOREIGN LANGUAGES

☐ Chinese    ☐ French    ☐ German    ☑ Italian    ☐ Japanese    ☐ Spanish    ☐ Russian Other Language: _____

EMPLOYMENT PROFILE

| 726 | Field: | Sales | Years of Exp.: | 3 | 722 |
|---|---|---|---|---|---|
| 728 | Level: | Upper Management | Desired Salary: | 50000 to 60000 | 716 |
| 720 | Travel: | Over 50% | Relocate?: | Yes | 724 |
| 730 | Availability: | 3 Weeks | Desired Employment: | Full | 718 |
| 732 | Actively Looking?: | No | | | |

*Fig. 7*

REZVU System™ Candidate Resume 800

John Doe 802
My Street
My Town, PA 99999
Phone: 610-555-1212
Email: me@my_mail.com
Personal URL: http//www.my.com/me/me.htm

REZVU System ID: JXD2720

Resume not submitted at this time. 804

806 [Go Back To Results] [New Search] 808

*Fig. 8*

METHOD AND SYSTEM FOR THE INTEGRATED STORAGE AND DYNAMIC SELECTIVE RETRIEVAL OF TEXT, AUDIO AND VIDEO DATA

FIELD OF THE INVENTION

This invention relates generally to the integrated storage, searching, and dynamic, selective retrieval of text and video data for different applications including employment. More particularly, it pertains to an automated system to input text, audio and video data, to integrate the storage of the data at a central location, to initiate queries of search criteria to the central location from remote locations, and to dynamically and selectively transmit text, audio and video data to the remote locations in accordance with the search criteria.

BACKGROUND

This invention involves a system and method for the integrated central storage and remote dynamic retrieval of text, audio, and video data for different applications including, but not limited to, an employment search system. The invention is particularly adapted for the input of text, audio and video data from employment candidates, the integrated storage of this employment data, and the dynamic, selective retrieval of text, audio, and video data at remote locations by employers based on their requirements.

Many different applications would benefit from a system which supports the integration of text, audio, and video data within a search system for the dynamic, selective retrieval of the data matching search criteria. For example, sellers and candidate buyers of real estate could use a real estate system which would enable a buyer to view text and video data on available residences which match the buyer's requirements on price, cost, tax, location, school district, floor space, yard size, etc. Also, a multimedia search system could be used in an athletic scouting service for viewing text and video data on available high school, college or professional athletes which match criteria on height, weight, age, athletic achievements such as basketball shooting percentage, baseball batting average, baseball fielding percentage, hockey goals, etc.

Other systems have disclosed the central storage and remote selective retrieval of text or video data. For example, U.S. Pat. No. 5,664,111 discloses a system and method for electronically executing transactions with a preprogrammed main computer having data and image storage and retrieval equipment. U.S. Pat. Nos. 4,870,576 and 5,032,989 disclose a system and method for locating real estate comprising a graphical interface for selection of a search area by a buyer. Similarly, U.S. Pat. No. 5,675,738 discloses a video information system comprising a plurality of video servers and a selection mechanism to enable each of a plurality of remote clients to select a video from a library. U.S. Pat. No. 5,528,282 discloses another video information system wherein each of a plurality of remote user stations issues control signals to selectively retrieve video signals from a central video server.

However, none of the previous systems enables the dynamic, selective transmission of text and video data to remote locations in accordance with queries of search criteria initiated at remote locations as required by different applications such as an employment search service, or an athletic scouting service. Accordingly, there exists a need for a system and method to input text and video data, to integrate the storage of the data at a central location, to initiate queries of search criteria to the central location from remote locations, and to dynamically and selectively transmit text and video data to the remote locations in accordance with the search criteria.

SUMMARY OF THE INVENTION

The invention provides a system and method to input text, audio, and video data, to integrate the storage of the data at a central location, to initiate queries of search criteria to the central location from remote locations, and to dynamically and selectively transmit text and video data to the remote locations in accordance with the search criteria.

In particular, it is an aspect of the present invention to present a system for multimedia data storage and dynamic, selective retrieval of multimedia data in accordance with specified search criteria comprising:
  one or more servers comprising:
    at least one input system for inputting text, audio, and video data;
    at least one database collection for integrated storing of the text, audio, and video data wherein the input utilities store the text, audio, and video data the indexed collections;
    at least one search system for inputting search criteria and for searching the database collection for the text, audio, and video data matching the search criteria;
    at least one audio/video system for dynamically displaying the matching audio data and video data;
    at least one client for specifying the text, audio, and video data and the search criteria and for viewing the text, audio, and video data; and
  a communication network for communication between the servers and the clients.

It is a further aspect of the present invention to present a system for multimedia data storage and dynamic, selective retrieval of multimedia data in accordance with specified search criteria wherein the input utility further comprises:
  an audio/video input system for inputting the audio data and the video data; and
  a text input utility for inputting the text data.

The present invention further presents a system for multimedia data storage and dynamic, selective retrieval of multimedia data in accordance with specified search criteria wherein the search system further comprises:
  a query filter for parsing the search criteria and creating corresponding queries and for restricting the corresponding queries to predetermined data of the text, audio and visual data;
  a search engine for searching the indexed collections for the search criteria; and
  a search display utility for displaying the text, audio, and video data matching the search criteria.

It is a further aspect of the present invention to present a method for multimedia data storage and dynamic, selective retrieval of multimedia data in accordance with specified search criteria comprising the steps of:
  inputting text, audio and video data with at least one input utility executing on one or more servers;
  integrated storing of the text, audio, and video data in at least one indexed collection with the input utilities;
  inputting search criteria and searching the indexed collection for the text, audio, and video data matching the search criteria with at least one search system;
  dynamically displaying the matching audio data and video data with at least one audio/video system;
  specifying the text, audio, and video data and the search criteria with at least one client;

viewing the matching text, audio, and video data with the clients; and communicating between the servers and the clients with a communication network.

It is a further aspect of the present invention to present a method for multimedia data storage and dynamic, selective retrieval of multimedia data in accordance with specified search criteria wherein the inputing text, audio and video data step further comprises the steps of:

inputing the audio data and the video data with an audio/video input system; and inputing the text data with a text input utility.

It is a further aspect of the present invention to present a method for multimedia data storage and dynamic, selective retrieval of multimedia data in accordance with specified search criteria wherein the inputing search criteria and searching the indexed collection step further comprises the steps of:

parsing the search criteria and creating corresponding queries with a query filter;

restricting the corresponding queries to predetermined data of the text, audio and visual data with the query filter;

searching the indexed collections for the search criteria with a search engine; and displaying the text, audio, and video data matching the search criteria with a search display utility.

BRIEF DESCRIPTION OF THE DRAWINGS

These and other objects and features of the invention will be more clearly understood from the following detailed description along with the accompanying drawing figures, wherein:

FIGS. 3a–3d display a sample fill-out form for input of text data;

FIG. 5 displays a sample search fill-out form for the input of queries at remote locations.

FIG. 6 displays a sample formatted page 600 of the search results.

FIG. 7 displays a sample focus page 700 of the selected result.

FIG. 8 displays a sample resume page 800 associated with the selected result.

DETAILED DESCRIPTION OF THE PREFERRED EMBODIMENT

The present invention is an automated system to input text and video data, to store the data at a central location, to initiate queries of search criteria to the central location from remote locations, and to selectively transmit text and video data to the remote locations in accordance with the search criteria. Accordingly, the present invention provides a system for multimedia data storage and dynamic selective retrieval of multimedia data in accordance with specified search criteria.

Without limitation, the system and method of the present invention can be explained within the context of an employment service called REZVU$^{SM}$. REZVU$^{SM}$ inputs text and audio/video data from employment candidates and stores this data in a database at a central location. REZVU$^{SM}$ inputs search criteria from employers seeking employment candidates and performs a corresponding search of the database. REZVU$^{SM}$ displays text and audio/video data for the employment candidates matching the search criteria.

While the present invention will be explained within the context of an employment service, it is apparent to one of ordinary skill in the art that the present invention can be applied to any application which would benefit from the storage of text and audio/video data and the selective retrieval of the data which matches specified search criteria. For example, the present invention could be used in a real estate system by a buyer to view text and video data on available residences which match the buyer's requirements on price, cost, tax, location, school district, floor space, yard size, etc. Also, the present invention could be used in an athletic scouting service for viewing text and video data on available high school, college or professional athletes which match criteria on height, weight, age, athletic achievements such as basketball shooting percentage, baseball batting average, baseball fielding percentage, hockey goals, etc.

Figure 1:
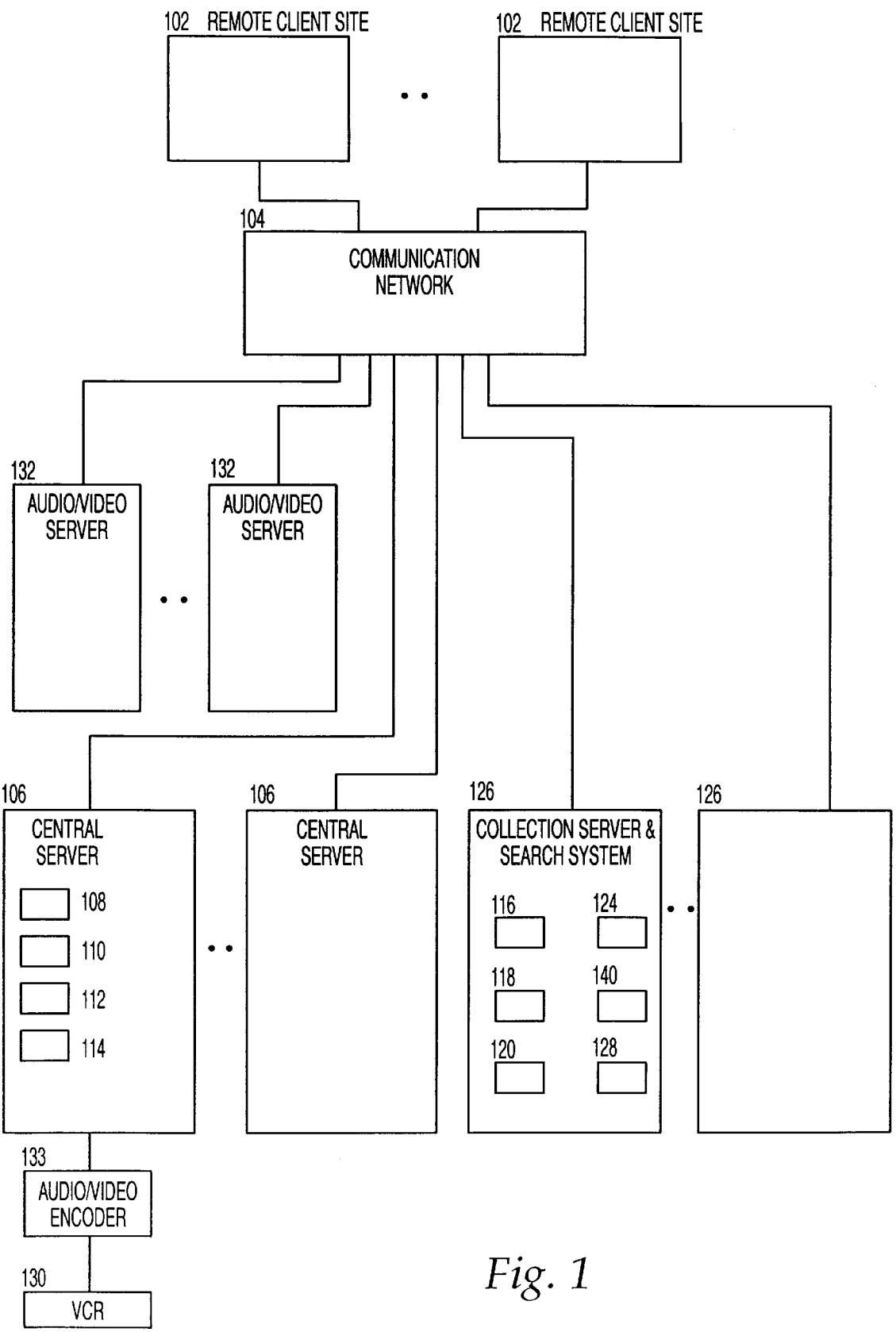
FIG. 1 is a block diagram showing the major operational elements of the invention.

FIG. 1 is a block diagram showing the major operational elements of the invention. A text input utility 108 executing on the central server 106 defines fill-out forms, processes the data specified on the fill-out forms and stores the data in a database 110. Preferably, the format of the fill-out forms to input the text data is specified with the HyperText Markup Language (HTML). HTML is a collection of platform-independent styles that define the various components of a World Wide Web document as specified in "A Beginner's Guide to HTML", The National Center for Supercomputing Applications, University of Illinois at Urbana-Champaign, Dec. 10, 1997, webmaster@ncsa.uiuc.edu, the contents of which are herein incorporated by reference.

Preferably, the text input utility 108 is a script executing on the central server 106. An exemplary scripting tool is Cold Fusion. Cold Fusion is a Web application tool for creating dynamic-page applications and interactive Web sites by combining standard HTML files with Cold Fusion Markup Language (CFML) tags as specified in "Cold-Fusion", http://www.allaire.com/services, the contents of which are herein incorporated by reference. Alternatively, the text input utility 108 is a program written in a language which manipulates text, files, and information, executing on the central server 106. An exemplary language is Perl as specified in, Programming Perl, Larry Wall and Randal L. Schwartz, O'Reilly & Associates, Inc., March 1992 ("Programming Perl"), the contents of which are herein incorporated by reference.

Exemplary databases 110 include: Microsoft SQL Server, Microsoft Access 1.0, 2.0 and 7.0, Microsoft FoxPro 2.0, 2.5 and 2.6, Oracle 7.0, Borland Paradox 3.X and 4.X, Borland dBase III and dBase IV, and Microsoft Excel 3.0, 4.0 and 5.0. Cold Fusion is compatible with the Microsoft ODBC (Open Database Connectivity) Desktop Drivers which includes support for these databases 110. Cold Fusion, pg 4.

The audio/video encoder 133 inputs audio/video signals. For example, the audio/video encoder 133 can input audio/video signals from a Video Cassette Recorder (VCR) 130. Preferably, the audio/video encoder 133 is a workstation having a video card and an audio card to digitize video signals and to digitize audio signals respectively.

The extraction utility 112 transfers the data from the database 110 to a bulk insert file (bif) 114. A style file 116 defines the format of the bif 114. An indexing utility 118 transforms the data from the bif 114 to an indexed collection 120 which can be accessed by a search engine 128. Preferably, the search engine 128 is Verity available from Verity, Inc. as described in, "Introduction to Verity Search Technology", http://www.verity.com/support/, the contents of which are herein incorporated by reference. Preferably, the style file 116, the indexing utility 118, the indexed collection 120, the query filter 140, and the search engine 128 reside on the collection server 122. The Verity Information Server architecture allows seamless communication with the central server 106. Exemplary communication protocols include NSAPI for Netscape Servers, ISAPI for Microsoft Internet Information Server and CGI for other servers as the Verity Information Server architecture supports these communication protocols. Preferably, the indexing utility 118 for use with Verity is mkvdk.

A query filter 140 executing on the collection server 122 defines fill-out forms and processes the search criteria specified on the fill-out forms to create queries for the collection server 126. Preferably, a script executing on the central server 106 processes the search criteria. Preferably, the scripting language is Verity SEARCHScript. SEARCHScript provides a common framework for developing Web applications with different applications. For example, SEARCHScript lets you customize search result displays with commands to access the next page or the next document. (See "Introduction to Verity Search Technology", pg 4.). Alternatively, a program written in a language which manipulates text, files, and information, processes the search criteria on the central server 106. An exemplary language is Perl. See Programming Perl.

The Verity query language supports a standard full text query or a query by example. The standard full-text query ranges from a simple one-word query to a complex query expression. The various kinds of full-text queries include a single word, a phrase where the two words must be found together in the document, multiple words separated by simple boolean operators (AND, OR), zone (i.e. title, author, etc.) queries and multiple words separated by advanced operators (i.e. <PARAGRAPH>). The query by example allows searchers to cut and paste a few lines or a paragraph of text from a document. See "Introduction to Verity Search Technology". The query filter 140 may restrict the queries to a specific indexed collection 120. Preferably, the query filter 140 is the Verity Server Component called Query Filter.

The search engine 128 searches the indexed collection 120 in accordance with the queries from the query filter 140. Before performing the search, the search engine 128 optimizes the queries as specified in Database System Concepts, Henry F. Korth, Abraham Silberschatz, McGraw-Hill 1986, Chapter 9, the contents of which are herein incorporated by reference. Preferably, the search engine 128 is the Verity Search '97 Information Server.

The search display utility 124 displays the search results text data at the remote client sites 102. The search display utility 124 uses a scripting language to display the search results text data. Preferably, the scripting language is Verity SEARCHScript. SEARCHScirpt provides a common framework for developing Web applications with different applications. For example, SEARCHScript lets you customize search result displays with commands to access the next page or the next document. (See "Introduction to Verity Search Technology", pg 4.).

Preferably, the present invention displays the audio/video data associated with the search results using an on-demand video and audio streaming server. Preferably, the streaming server is RealServer™ as explained in "RealServer Administration and Content Creation Guide", the contents of which are herein incorporated by reference. The Web Browser 134 executing on the remote clients 102 displays the web pages from the central server 106 including the fill-out form for data input, the fill-out form for input of search criteria and the search results text data. The Web page containing the search results text data contains a link to a metafile. The Web Browser 134 executing on the remote clients 102 requests the metafile from the central server 106 when the user clicks the link to the metafile.

The search display utility 124 delivers the metafile to the Web browser 134. If the metafile has a .ram file extension, the search display utility 124 sets the MIME type of the file to "audio/x-pn-RealAudio". If the metafile has a rpm file extension, the search display utility 124 sets the MIME type of the file to "video/x-pn-RealVideo-plugin" or "audio/x-pn-RealAudio-plugin". See RealServer Administration and Content Creation Guide, pg 18.

The Web browser 134 starts up the helper application 136 upon encountering a metafile with a ram file extension or a rpm file extension. Preferably, the helper application 136 is the RealPlayer, available from Real Networks Inc. The RealPlayer helper application 136 reads the first URL from the metafile and requests it from the audio/video server 132. Preferably, the audio/video server 132 is the RealServer, available from Real Networks Inc. The RealServer audio/video server 132 streams the requested video or audio clip to the RealPlayer helper application 136.

The applications executing on the remote clients 102 communicate with the applications executing on the central server 106 via the communication network 104. Preferably, the communication network 104 is the World Wide Web.

As shown in FIG. 1, the present invention can contain a plurality of remote client sites 102, a plurality of audio/video servers 132, a plurality of central servers 126 and a plurality of collection servers 126 to support higher capacity requirements.

FIGS. 3a–3d displays a sample fill-out form 300 for input of text data. In the preferred embodiment, the sample fill-out form contains the following fields:

Name 310: This field specifies the first name, middle initial and last name of the candidate seeking employment.

Address 312: This field specifies the street address, city, state and zip code of the candidate seeking employment.

Telephone and Fax Numbers 314: This field specifies the phone number, an alternate phone number and a facsimile number of the candidate seeking employment.

Email 316: This field contains the email address of the candidate seeking employment.

Personal URL 318: This field contains the personal URL of the candidate seeking employment.

Private 320: This field contains the privacy preference of the candidate seeking employment. If the candidate answers "Yes" to the privacy question, the employment search system will not return the candidate's data to search queries. Instead, the employment search system will only reveal the candidate's data to entities which have the candidate's identification number. Accordingly, the candidate can limit access to the candidate's data to a select number of entities by answering "Yes" to the privacy question and by revealing the identification number only to those select number of entities.

Next Page 322: This field contains an HTML link to the next page in the fill-out form 300.

Associates Degree 324: This field identifies associates degree information for the candidate seeking employment including the school, the major, the year and the grade point average (GPA).

Bachelor Degree 326: This field identifies bachelor degree information for the candidate seeking employment including the school, the major, the year and the GPA.

Master Degree 328: This field identifies masters degree information for the candidate seeking employment including the school, the major, the year and the GPA.

Doctorate Degree 330: This field identifies doctorate degree information for the candidate seeking employment including the school, the major and the year.

Foreign Languages 332: This field identifies the foreign language knowledge of the candidate seeking employment.

Professional Certifications 334: This field identifies the professional certifications of the candidate seeking employment.

Next Page 336: This field contains an HTML link to the next page in the fill-out form 300.

Commitment Interest 338: This field specifies whether the candidate is seeking full-time employment, part-time employment or both.

Field 340: This field specifies the field of interest of the candidate seeking employment.

Experience 342: This field specifies the number of years of experience of the candidate seeking employment in the specified field 340.

Level 344: This field specifies the employment level sought by the candidate.

Salary 346: This field specifies the salary requirement of the candidate seeking employment.

Travel 348: This field specifies the travel limitations of the candidate seeking employment.

Relocation 350: This field specifies whether the candidate seeking employment is willing to relocate.

Availability 352: This field specifies when the candidate seeking employment will be available to begin work.

Actively Looking 354: This field indicates whether the candidate seeking employment is actively looking or is willing to consider a new opportunity.

Major Accomplishments 356: This field identifies the major accomplishments of the candidate seeking employment in addition to the accomplishments previously specified in the fill-out form 300.

Next Page 357: This field contains an HTML link to the next page in the fill-out form 300.

Resume 358: This field includes the resume for the candidate seeking employment.

Preferably, the indexed collection 120 in Verity comprises two sets of tables. The first set of tables corresponds to specialized fields which are explicitly requested in the fill-out form 300. The second set of tables corresponds to data from the resume of the candidate seeking employment.

Figure 2:
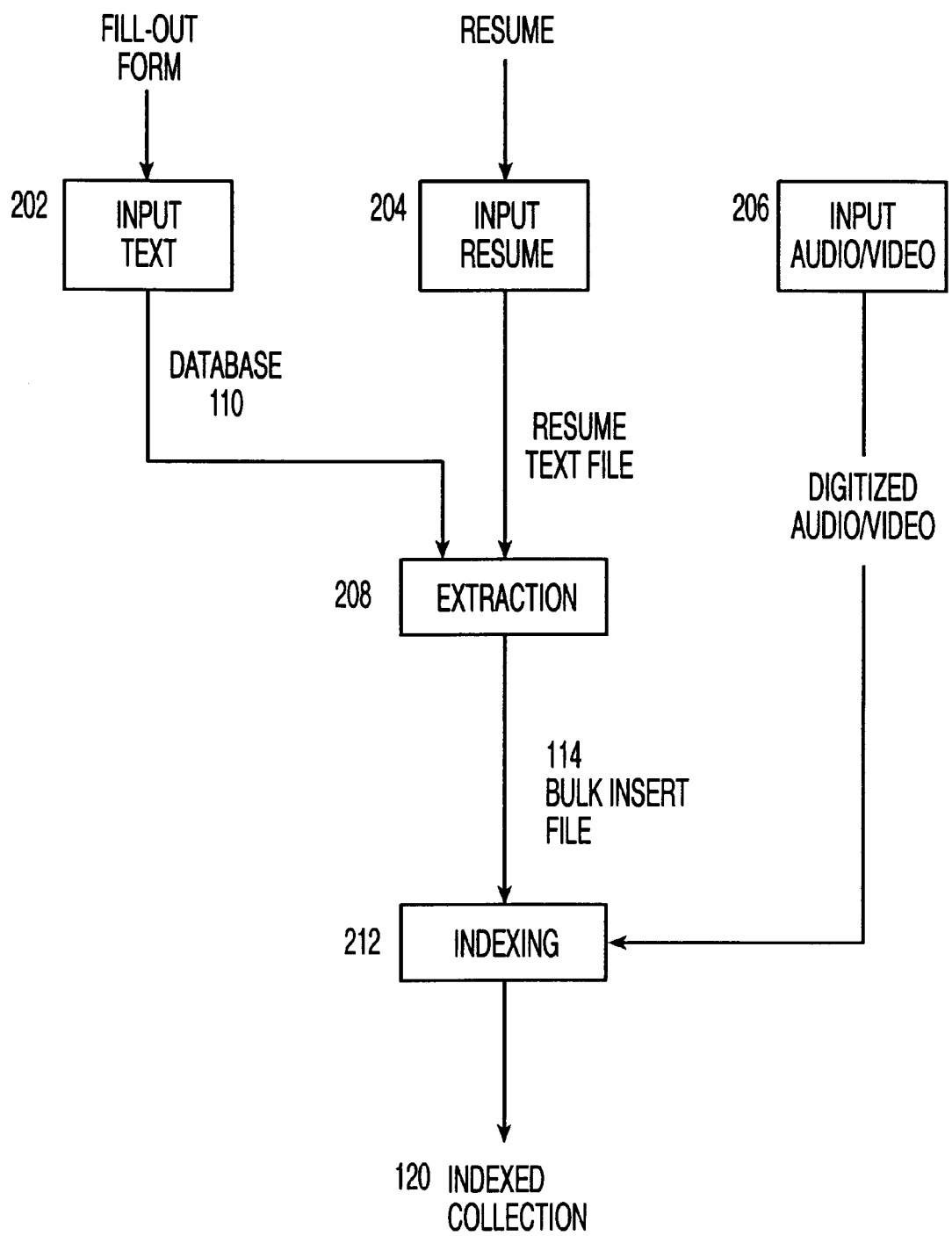
FIG. 2 is a flow chart describing the input and integrated storage of text, audio, and video data.
Figure 3D:
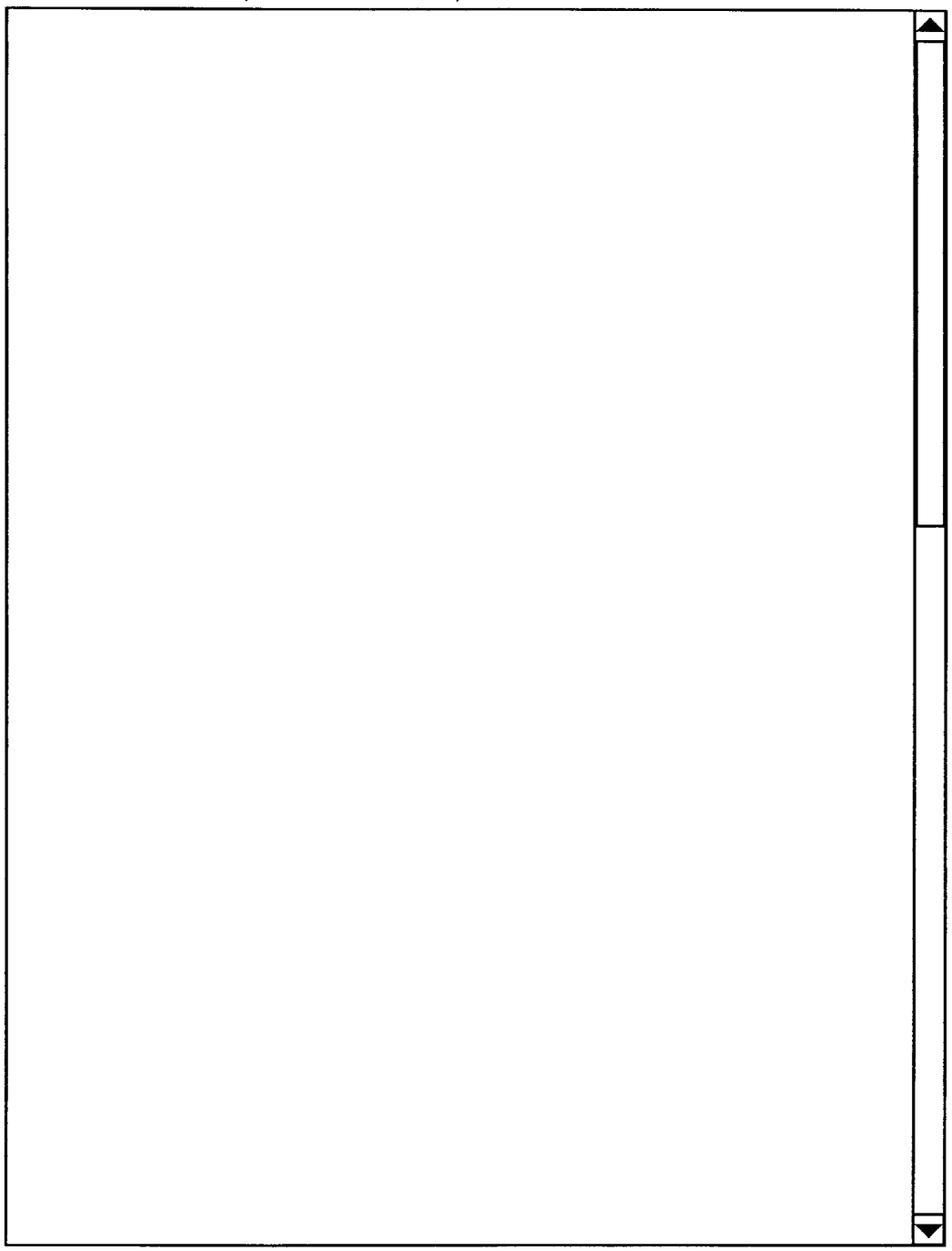

FIG. 2 is a flow chart describing the input and integrated storage of text, audio, and video data. In step 202, the text input utility 108 executing on the central server 106 processes the fill-out forms which are displayed on a remote client 102 by the Web Browser 134 and stores the data in a database 110. Similarly, in step 204, the text input utility 108 executing on the central server 106 processes free format text data such as a resume and stores the data in a text file.

After the candidate employee registers by sending a registration form, the service fee and an audio/video recording to REZVU$^{SM}$, the audio/video server 132 inputs the audio/video data and processes the audio/video data to create digitized audio and digitized video files in step 206.

In step 208, the extraction utility 112 assembles the text data from the database 110 for all registered candidates into the bulk insert file 114 in accordance with the format defined by the style file 116. The extraction utility 112 also provides a reference in the bulk insert file 114 to the resume text file in step 208. Next, in step 212, the indexing utility 118, using the style file 116, transforms the data from the bif 114 to an indexed collection 120 which can be accessed by the search engine 128.

FIG. 5 displays a sample search fill-out form 500 for input of queries at remote locations. In the preferred embodiment, the search fill-out form 500 contains the following fields:

Profession 502: This field specifies the profession which is desired by the employer seeking employment candidates.

State 504: This field specifies the state of the business location where the employer seeks employment candidates.

Relocate 506: This field specifies whether the employer is willing to relocate employment candidates.

Level 508: This field specifies the employment level which is desired by the employer seeking employment candidates.

Years of Experience 510: This field specifies the amount of experience which is desired by the employer seeking employment candidates.

Salary Range 512: This field specifies the salary range which is desired by the employer seeking employment candidates.

Degree 514: This field specifies the level of education which is desired by the employer seeking employment candidates.

Associate Degree 516: This field specifies the associates degree which is desired by the employer seeking employment candidates.

Bachelor Degree 518: This field specifies the bachelors degree which is desired by the employer seeking employment candidates.

Foreign Languages 520: This field specifies the foreign language skills which are desired by the employer seeking employment candidates.

Travel 522: This field specifies the travel requirements of the employer seeking employment candidates.

Desired Employment 524: This field specifies whether the employer is seeking candidate employees for full-time employment, part time employment, independent contractor employment or all types of employment.

Resume Time Period 526: This field specifies the resume dates of interest to the employer seeking candidate employees.

Video Requirement 528: This field specifies whether the employer is interested in candidates who do not have a video stored within the employment system.

Keywords 530: This field contains either a standard full text query or a query by example.

Candidate's User Id 532: This field specifies the user id of the candidate seeking employment. The field can be used by employers who have obtained the candidate's user id from the candidate. Accordingly, the field enables select employers to access data for candidates who have specified the Private option 320.

Search 534: This field executes the search based on the search criteria input by the user.

Figure 4:
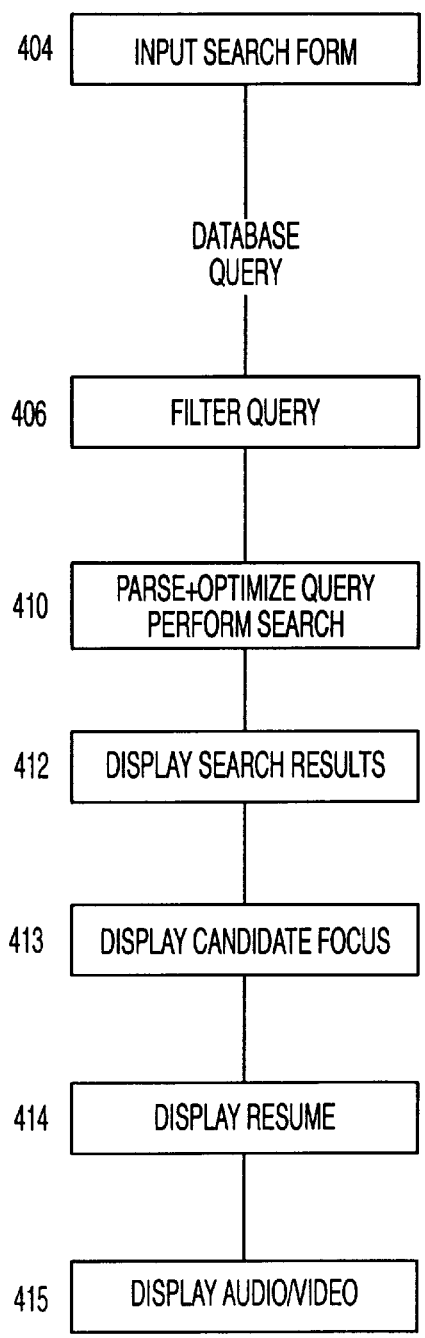
FIG. 4 is a flow chart describing the initiation of queries and the dynamic, selective display of the search results at remote locations.

FIG. 4 is a flow chart describing the initiation of queries and the dynamic, selective display of the search results at remote locations. In step 402, the query filter 140 executing on the central server 106 defines search fill-out forms 500 (FIG. 5) which are displayed on a remote client 102 by the Web Browser 134. As previously explained by the discussion of FIG. 5, the search fill-out form 500 contains fields corresponding to the specialized fields of the text fill-out form 300 (502–528) and a field corresponding to resume data (530). In step 404, the query filter 140 processes the search criteria specified on the search fill-out forms 500 for both the specialized fields 502–528 and the resume data 530 to create queries for the collection server 126.

Next, the query filter 140 may restrict the queries to a specific indexed collection 120 in step 406. Accordingly, the query filter 140 may restrict the query within REZVO$^{SM}$ to prevent searching of text data associated with employment candidates who specified the Private option 320 on the text fill-out form 300.

After the employer seeking candidate employees hits the search HTML link 534 on the search fill-out form 500, a search engine 128 searches the indexed collection 120 in accordance with the specified search criteria in step 410. Before performing the search, the search engine 128 parses and optimizes the queries. See Database System Concepts, Chapter 9.

In step 412, the search display utility 124 forms the search results 600 (FIG. 6) which are displayed on a remote client 102 by the Web Browser 134. In step 413, the search display utility 124 and the Web browser operate to display a candidate focus page 700 for the candidate selected by the user (FIG. 7). In step 414, the search display utility 124 and the Web browser 134 operate to display the resume of the candidate selected by the user (FIG. 8) when the user clicks a resume link. In step 415, the search display utility 124, the Web browser 134, the helper application 136, and the audio/video server 132 operate to play the video and audio data associated with the displayed text data when the user clicks an audio/video link.

FIG. 6 displays a sample formatted page 600 of the search results. Preferably, the search results 600 contains the following fields:

Result Summary 602: This field identifies the number of employment candidates which met the search criteria and the number of employment candidates which are displayed on the search results 600.

focus link 604: This field contains a link to the candidate focus page 700 (FIG. 7).

Associates Degree 606: This field specifies the academic record of the employment candidate's Associates Degree including the major, graduation year, school, and grade point average.

Bachelors 608: This field specifies the academic record of the employment candidate's Bachelor's Degree including the major, graduation year, school, and grade point average.

Masters 610: This field specifies the academic record of the employment candidate's Master's Degree including the major, graduation year, school, and grade point average.

Doctorate 612: This field specifies the academic record of the employment candidate's Doctorate's Degree including the major, graduation year, school, and grade point average.

Certifications 614: This field specifies the certifications of the employment candidate which could include a license to practice law, to prosecute patent applications before the Pat. and Trademark Office, a Certified Public Accountant, etc.

Desired Salary Range 616: This field specifies the salary range which is desired by the employment candidate.

Desired Employment 618: This field specifies whether the employment candidate is seeking candidate a full-time position, a part-time position or an independent contractor position.

Travel 620: This field specifies the percentage of time which the employment candidate is willing to travel.

Years of Experience 622: This field specifies the amount of experience of the employment candidate.

Relocate 624: This field specifies whether the employment candidate is willing to relocate for employment.

Major Career Accomplishments 626: This field specifies the major career accomplishments of the employment candidate.

FIG. 7 displays a sample candidate focus page 700 of the selected result. Preferably, the candidate focus page 700 contains the following fields:

Name and Personal Data 702: This field contains the selected candidate's name, address, phone number, fax number, email address, personal URL and REZVU$^{SM}$ system number.

audio/video link 704: This field contains a link to play the audio and video associated with the employment candidate.

Associates Degree 706: This field specifies the academic record of the employment candidate's Associates Degree including the major, graduation year, school, and grade point average.

Bachelors 708: This field specifies the academic record of the employment candidate's Bachelor's Degree including the major, graduation year, school, and grade point average.

Masters 710: This field specifies the academic record of the employment candidate's Master's Degree including the major, graduation year, school, and grade point average.

Doctorate 712: This field specifies the academic record of the employment candidate's Doctorate's Degree including the major, graduation year and school.

Certifications 714: This field specifies the certifications of the employment candidate which could include a license to practice law, to prosecute patent applications before the Patent and Trademark Office, a Certified Public Accountant, etc.

Desired Salary Range 716: This field specifies the salary range which is desired by the employment candidate.

Desired Employment 718: This field specifies whether the employment candidate is seeking candidate a full-time position, a part-time position or an independent contractor position.

Travel 720: This field specifies the percentage of time which the employment candidate is willing to travel.

Years of Experience 722: This field specifies the amount of experience of the employment candidate.

Relocate 724: This field specifies whether the employment candidate is willing to relocate for employment.

Field 726: This field specifies the employment candidate's field.

Level 728: This field specifies the level of the employment candidate.

Availability 730: This field specifies when the employment candidate will be available.

Actively Looking 732: This field specifies whether the employment candidate is actively looking.

resume link 704: This field contains a link to the employment candidate's resume.

FIG. 8 displays a sample resume page 800 associated with the selected result. Preferably, the resume page 800 contains the following fields:

Name and Personal Data 802: This field contains the selected candidate's name, address, phone number, fax number, email address, personal URL and REZVU$^{SM}$ system number.

resume 804: This field contains the resume of the employment candidate.

search results link 806: This field contains a link to return to the search results 600 (FIG. 6).

search link 808: This field contains a link to return to the search fill out form 500 (FIG. 5).

While the above invention has been described with reference to certain preferred embodiments, the scope of the present invention is not limited to these embodiments. One skilled in the art may find variations of these preferred embodiments which, nevertheless, fall within the spirit of the present invention, whose scope is defined by the claims set forth below.

What is claimed is:

1. A system for multimedia data storage and dynamic, selective retrieval of multimedia data in accordance with specified search criteria comprising:
   one or more servers comprising:
      at least one input utility for inputting text, audio, and video data wherein said text data comprises:
         predefined text data; and
         free format text data;
      at least one database collection for integrated storing of said text, audio, and video data wherein said at least one input utility stores said text, and video data in said at least one indexed collection;
      at least one search system for inputting search criteria and for searching said database collection for said text, audio, and video data matching said search criteria;
      at least one audio/video system for dynamically displaying said matching audio data and video data;
   at least one client for specifying said text, audio, video data and said search criteria and for viewing said text, audio, and video data; and
   a communication network for communication between said one or more servers and said at least one client.

2. A system for multimedia data storage and dynamic, selective retrieval of multimedia data in accordance with specified search criteria as in claim 1 wherein said at least one input utility further comprises:
   an audio/video input system for inputing said audio data and said video data; and
   a text input utility for inputing said text data.

3. A system for multimedia data storage and dynamic, selective retrieval of multimedia data in accordance with specified search criteria as in claim 2 wherein said audio/video input system further comprises a video card for digitizing said audio and video data.

4. A system for multimedia data storage and dynamic, selective retrieval of multimedia data in accordance with specified search criteria as in claim 2 wherein said text input utility further comprises:
   a text processing utility for inputing said text data to a database;
   an extraction utility for assembling said text data from said database to a bulk insert file; and
   an indexing utility for organizing said text data from said bulk insert file and said audio and video data into said at least one indexed collection.

5. A system for multimedia data storage and dynamic, selective retrieval of multimedia data in accordance with specified search criteria as in claim 4 further comprising a style file for defining a format of said bulk insert file.

6. A system for multimedia data storage and dynamic, selective retrieval of multimedia data in accordance with specified search criteria as in claim 4 wherein said text processing utility inputs said text data from a data input fill-out form.

7. A system for multimedia data storage and dynamic, selective retrieval of multimedia data in accordance with specified search criteria as in claim 6 wherein a hypertext mark up language defines a format of said data input fill-out form.

8. A system for multimedia data storage and dynamic, selective retrieval of multimedia data in accordance with specified search criteria as in claim 6 wherein said text processing utility is a script for manipulating said text data.

9. A system for multimedia data storage and dynamic, selective retrieval of multimedia data in accordance with specified search criteria as in claim 6 wherein said text processing utility is a program for manipulating said text data.

10. A system for multimedia data storage and dynamic, selective retrieval of multimedia data in accordance with specified search criteria as in claim 1 wherein said search system further comprises:
   a query filter for parsing said search criteria and creating corresponding queries and for restricting said corresponding queries to predetermined data of said text, audio and visual data;
   a search engine for searching said at least one indexed collection for said search criteria; and
   a search display utility for displaying said text, audio, and video data matching said search criteria.

11. A system for multimedia data storage and dynamic, selective retrieval of multimedia data in accordance with specified search criteria as in claim 10 wherein said search engine searches said at least one indexed collection by executing said corresponding queries from said query filter.

12. A system for multimedia data storage and dynamic, selective retrieval of multimedia data in accordance with specified search criteria as in claim 10 wherein said query filter parses said search criteria from a search fill-out form.

13. A system for multimedia data storage and dynamic, selective retrieval of multimedia data in accordance with specified search criteria as in claim 12 wherein a hypertext mark up language defines a format of said search fill-out form.

14. A system for multimedia data storage and dynamic, selective retrieval of multimedia data in accordance with specified search criteria as in claim 12 wherein said query filter further comprises a script for manipulating said search criteria.

15. A system for multimedia data storage and dynamic, selective retrieval of multimedia data in accordance with specified search criteria as in claim 12 wherein said query filter further comprises a program for manipulating said search criteria.

16. A system for multimedia data storage and dynamic, selective retrieval of multimedia data in accordance with specified search criteria as in claim 1 wherein said communication network is the World Wide Web.

17. A system for multimedia data storage and dynamic, selective retrieval of multimedia data in accordance with specified search criteria as in claim 1 wherein said indexed collection comprises:

at least one first table corresponding to said predefined text data; and at least one second table corresponding to said free format text data.

18. A system for multimedia data storage and dynamic, selective retrieval of multimedia data in accordance with specified search criteria as in claim 1 wherein:

said predefined text data is data associated with an employment candidate;

said free format text data is resume data; and said audio and video data is an audio/visual recording of the employment candidate.

19. A method for multimedia data storage and dynamic, selective retrieval of multimedia data in accordance with specified search criteria comprising the steps of:

inputing text, audio and video data with at least one input utility executing on one or more servers comprising the step of:

partitioning the text data into predefined text data and free format text data;

integrated storing of said text, audio, and video data in at least one indexed collection with the at least one input utility;

inputing search criteria and searching the indexed collection for the text, audio, and video data matching the search criteria with at least one search system;

dynamically displaying the matching audio data and video data with at least one audio/video system;

specifying the text, audio, and video data and the search criteria with at least one client;

viewing the matching text, audio, and video data with the at least one client; and communicating between the one or more servers and the at least one client with a communication network.

20. A method for multimedia data storage and dynamic, selective retrieval of multimedia data in accordance with specified search criteria as in claim 19 wherein said inputing text, audio and video data step further comprises the steps of:

inputing the audio data and the video data with an audio/video input system; and inputing the text data with a text input utility.

21. A method for multimedia data storage and dynamic, selective retrieval of multimedia data in accordance with specified search criteria as in claim 20 wherein said inputing the audio data and the video data step further comprises the step of digitizing the audio and video data with an audio/video card.

22. A method for multimedia data storage and dynamic, selective retrieval of multimedia data in accordance with specified search criteria as in claim 20 wherein said inputing the text data step further comprises the steps of:

inputing the text data to a database with a text processing utility;

assembling the text data from the database to a bulk insert file with an extraction utility; and organizing the text data from the bulk insert file and the audio and video data into the at least one indexed collection with an indexing utility.

23. A method for multimedia data storage and dynamic, selective retrieval of multimedia data in accordance with specified search criteria as in claim 22 wherein said assembling the text data step further comprises the step of defining a format of the bulk insert file with a style file.

24. A method for multimedia data storage and dynamic, selective retrieval of multimedia data in accordance with specified search criteria as in claim 22 wherein said inputing said text data step inputs the text data from a data input fill out form.

25. A method for multimedia data storage and dynamic, selective retrieval of multimedia data in accordance with specified search criteria as in claim 24 wherein said inputing the text data step further comprises the step of defining a format of the data input fill out form with a hypertext mark up language.

26. A method for multimedia data storage and dynamic, selective retrieval of multimedia data in accordance with specified search criteria as in claim 24 wherein said inputing the text data step further comprises the step of manipulating the text data with a script.

27. A method for multimedia data storage and dynamic, selective retrieval of multimedia data in accordance with specified search criteria as in claim 24 wherein said inputing the text data step further comprises the step of manipulating the text data with a program.

28. A method for multimedia data storage and dynamic, selective retrieval of multimedia data in accordance with specified search criteria as in claim 19 wherein said inputing search criteria and searching the indexed collection step further comprises the steps of:

parsing the search criteria and creating corresponding queries with a query filter;

restricting the corresponding queries to predetermined data of the text, audio and visual data with the query filter;

searching the at least one indexed collection for the search criteria with a search engine; and displaying the text, audio, and video data matching the search criteria with a search display utility.

29. A method for multimedia data storage and dynamic, selective retrieval of multimedia data in accordance with specified search criteria as in claim 28 wherein said searching said at least one indexed collection further comprises the step of executing the corresponding queries from the query filter.

30. A method for multimedia data storage and dynamic, selective retrieval of multimedia data in accordance with specified search criteria as in claim 28 wherein said parsing the search criteria step parses the search criteria from a search fill-out form.

31. A method for multimedia data storage and dynamic, selective retrieval of multimedia data in accordance with specified search criteria as in claim 28 wherein said parsing the search criteria step further comprises the step of formatting the search fill out form with a hypertext mark up language.

32. A method for multimedia data storage and dynamic, selective retrieval of multimedia data in accordance with specified search criteria as in claim 19 wherein said communicating step uses the World Wide Web.

33. A method for multimedia data storage and dynamic, selective retrieval of multimedia data in accordance with specified search criteria as in claim 32 wherein said parsing the search criteria step further comprises the step of manipulating the search criteria with a script.

34. A method for multimedia data storage and dynamic, selective retrieval of multimedia data in accordance with specified search criteria as in claim 32 wherein said parsing the search criteria step further comprises the step of manipulating the search criteria with a program.

35. A method for multimedia data storage and dynamic, selective retrieval of multimedia data in accordance with specified search criteria as in claim 19 wherein said integrated storing of the text, audio, and video data further comprises the steps of:

defining at least one first table corresponding to the predefined text data; and defining at least one second table corresponding to the free format text data.

36. A method for multimedia data storage and dynamic, selective retrieval of multimedia data in accordance with specified search criteria as in claim 19 wherein said inputted text, audio and video data further comprises the step of:

associating the predefined text data with data about an employment candidate;

defining the free format text data as resume data; and defining the audio and video data as an audio/visual recording of the employment candidate.

\* \* \* \* \*